(12) United States Patent
Licht

(10) Patent No.: US 7,504,048 B2
(45) Date of Patent: Mar. 17, 2009

(54) AXIAL CONVECTIVE REFORMER

(75) Inventor: William Robert Licht, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 660 days.

(21) Appl. No.: 11/153,025

(22) Filed: Jun. 14, 2005

(65) Prior Publication Data

US 2006/0277828 A1    Dec. 14, 2006

(51) Int. Cl.
*C01B 3/26* (2006.01)
(52) U.S. Cl. .................. 252/373; 423/652; 423/653; 423/654
(58) Field of Classification Search .......... 423/652, 423/653, 654; 252/373
See application file for complete search history.

(56) References Cited

U.S. PATENT DOCUMENTS

| | | | | |
|---|---|---|---|---|
| 2,625,470 | A * | 1/1953 | Roberts, Jr. ................. 48/198.1 |
| 3,094,391 | A | 6/1963 | Mader | |
| 4,959,079 | A | 9/1990 | Grotz et al. | |
| 4,985,231 | A * | 1/1991 | Lywood ................ 423/652 |
| 5,030,661 | A * | 7/1991 | Lywood ................ 518/704 |
| 5,925,328 | A * | 7/1999 | Stahl et al. ................. 423/650 |
| 6,077,459 | A * | 6/2000 | Laursen et al. .............. 252/376 |
| 6,103,143 | A * | 8/2000 | Sircar et al. ................ 252/373 |
| 6,746,624 | B1 * | 6/2004 | Seier Christensen et al. ......... 252/373 |
| 6,818,028 | B2 | 11/2004 | Barnett et al. | |
| 2003/0027096 | A1 * | 2/2003 | Barnett et al. ............... 432/180 |
| 2004/0065014 | A1 | 4/2004 | Christensen et al. | |
| 2004/0134127 | A1 | 7/2004 | Pham et al. | |

FOREIGN PATENT DOCUMENTS

| EP | 1 277 697 A | 1/2003 |
|---|---|---|
| EP | 1 329 256 A | 7/2003 |

\* cited by examiner

*Primary Examiner*—Wayne Langel
(74) *Attorney, Agent, or Firm*—Bryan C. Hoke, Jr.

(57) ABSTRACT

A steam/hydrocarbon reformer employing a conventional radiantly heated first reformer section and a flue-gas heated second reformer section is disclosed. The second reformer section comprises catalyst-containing tubes for partially reforming a hydrocarbon stream. The catalyst-containing tubes in the second reformer section are disposed in a conduit for conveying flue gas from the first reformer section, thereby receiving heat from the flue gases. The flue gases flow either cocurrent or countercurrent to the process gas in the catalyst-containing tubes in the second reformer section. The partially reformed hydrocarbon stream from the second reformer section is fed to the catalyst-containing tubes in the first reformer section thereby producing a hydrogen-rich synthesis gas.

6 Claims, 6 Drawing Sheets

AXIAL CONVECTIVE REFORMER

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

This invention relates to steam-hydrocarbon reformers, and more particularly to the application of a second reforming section in the design of a steam-hydrocarbon reformer.

Steam-hydrocarbon reforming is widely used to make synthesis gas (syngas) for hydrogen plants, methanol plants, ammonia plants and the like. Synthesis gas is defined herein as a gas comprising hydrogen and carbon monoxide. Hydrogen and syngas are typically produced by reforming a steam/hydrocarbon mixture at high temperature in a fired reformer. Such a reformer contains catalyst filled tubes which convey the feed at elevated pressure through the furnace where it is heated and reacts to generate the syngas product. The furnace is heated by combusting fuel with air outside of the reformer tubes at near ambient pressure. High temperatures are required to achieve good conversion. The efficiency is improved by using the waste heat contained in both the flue gas and the product which exit the fired reformer. This waste heat has traditionally been used to preheat the feed and to generate steam for the process and for steam export. Significant quantities of export steam are generated and must be utilized for an efficient process. Although steam is a useful by-product, it my be difficult to find a customer for the steam or significant expense can be incurred to pipe it to the end-user. In addition, because a significant quantity of fuel is burned to generate steam, the fuel usage and carbon dioxide emissions per unit of hydrogen or syngas generated are high.

Modern reformers employ additional methods to use the waste heat from the reformer in order to reduce the fuel usage, the amount of export steam and the quantity of carbon dioxide emitted. In particular, the air and/or fuel may be heated before combustion in the furnace. Also, the steam/hydrocarbon feeds can be heated separately or combined to higher temperatures. These methods reduce the amount of fuel that is required for a given amount of syngas production. However, materials of construction become expensive or unavailable as the temperatures are raised and the temperature to which the feed and fuel can be preheated is limited by the tendency of the hydrocarbons to crack (form solid carbon which fouls and plugs exchangers) at high temperature.

In order to overcome these limitations the industry has developed specialized designs that recover the waste heat by reforming. The most widely practiced of these processes is an adiabatic prereformer in which the feed is first preheated then directed to an adiabatic vessel filled with specialized prereformer catalyst. The gas partially reforms (converts to hydrogen and carbon monoxide) which reduces the temperature due to the endothermic nature of the reaction. This gas is then further heated against the flue gas stream from the fired reformer and then introduced to the tubes in the fired reformer to achieve the desired outlet conditions. Prereforming reduces the size of the primary reformer since part of the duty is accomplished in the adiabatic reactor. It also reduces the amount of fuel, export steam and carbon dioxide emitted since the partial reforming is accomplished with waste heat. A prereformer can be combined with the other methods mentioned above to further improve the efficiency of syngas generation.

The primary disadvantage of the adiabatic prereformer is the specialized catalyst that is required. It has a high nickel content to achieve good activity at relatively low temperatures and tends to be sensitive to steam. The steam sensitivity requires special operating methods during start-up and shut-down to avoid damaging the catalyst. The adiabatic reformer is also limited in the amount of conversion it can achieve: typically 15% for natural gas feedstocks. This is because reforming of light feedstocks is endothermic (the reforming gas cools in an adiabatic reactor) thereby self-limiting the amount of reforming that can take place.

Regardless of what additional equipment is provided to improve the efficiency with which syngas is generated, the fired reformer is a major cost item in the plant. The tubes in the radiant section of a conventional reforming furnace are generally filled with a catalyst such as nickel on an alumina support. Care must be taken to minimize the formation of coke on the catalyst, as well as the introduction of catalyst-poisoning contaminants in the feed stream supplied to the tubes. Coke formation generally occurs at the entry of the hot feedstock into the tubes, before sufficient hydrogen is present in the gas to inhibit coke formation. Different catalyst, such as small diameter catalyst or potassium promoted catalyst, is used at the tube inlet to reduce the potential for coke formation. The catalyst at the tube inlet is also more susceptible to deactivate in the event catalyst poisons are fed into the tubes.

Prereforming reduces the cost of the fired reformer by shifting the duty to the prereforming reactor. However, there are additional benefits. In particular, hydrocarbons higher than methane have a greater tendency to form coke on the catalyst when operated at high temperature. This limits the heat flux that the reformer can be designed for and expected to operate for long periods between catalyst change-out. Prereforming converts the hydrocarbons heavier than methane in the prereformer and retains catalyst poisons which allows the primary reformer to be designed for higher heat flux resulting in a smaller, less expensive reformer.

Various methods have been proposed that include heating of the prereformer with the waste heat from the flue gas. These earlier methods lack the flexibility needed to permit independent optimization of multiple reforming stages.

It would be useful to have an apparatus and process whereby multiple reforming stages may be optimized independently, thereby having higher efficiency, lower capital costs, and reduced maintenance.

Related patents include U.S. Pat. No. 3,094,391 to Mader, U.S. Pat. No. 6,818,028 to Barnett et al., and U.S. Pat. No. 4,959,079 to Grotz et al.

BRIEF SUMMARY OF THE INVENTION

The current invention relates to a steam/hydrocarbon reformer for producing synthesis gas. The reformer comprises a first reforming section having a plurality of catalyst-containing tubes at least partially disposed within a combustion chamber. The chamber has a first end wall and a second end wall opposite the first end wall. The first end wall of the reformer may be the upper end wall and the second end wall may be the lower end wall. At least one burner is attached to the first end wall and at least one outlet is located either in the second end wall or adjacent the second end wall. The reformer further comprises a second reforming section having a plurality of catalyst-containing tubes at least partially disposed within a conduit. The conduit has an inlet for receiving at least a portion of the flue gas from the combustion chamber and an outlet. The catalyst-containing tubes of the second reforming section produce a hydrogen-containing, partially reformed hydrocarbon stream that is fed to the catalyst-containing tubes of the first reforming section. The catalyst-containing tubes of the second reforming section each have a longitudinal axis that is substantially parallel with the longitudinal axis of the conduit.

The catalyst-containing tubes in the first reforming section may be substantially vertical. The catalyst-containing tubes in the second reforming section may be substantially vertical. The length of the catalyst-containing tubes in the second reforming section may be at least 75% of the length of the catalyst-containing tubes in the first reforming section. The quantity of catalyst-containing tubes in the second reforming section may be less than in the first reforming section.

The reformer may comprise a collection manifold for receiving the partially reformed hydrocarbon stream from the catalyst-containing tubes of the second reforming section. The reformer may further comprise a distribution manifold for receiving the partially reformed hydrocarbon stream from the collection manifold. The distribution manifold may feed the catalyst-containing tubes in the first reforming section.

One or more of the catalyst-containing tubes in the first reforming section may comprise an inner tube containing no catalyst and at least partially disposed within the one or more catalyst-containing tubes in the first reforming section. One or more of the catalyst-containing tubes in the second reforming section may comprise an inner tube containing no catalyst and at least partially disposed within the one or more catalyst-containing tubes in the second reforming section.

The current invention also relates to a steam reforming process for producing synthesis gas. The steam reforming process comprises introducing a fuel and an oxidant from a first end of a combustion chamber and reacting the fuel and oxidant therein, thereby generating a flue gas, withdrawing the flue gas from an outlet at the end opposite the first end of the chamber, introducing the flue gas from the chamber to the first end of a conduit, and withdrawing the flue gas from the second end of the conduit. The steam reforming process further comprises introducing a feed stream comprising a hydrocarbon and steam into catalyst-containing tubes that are at least partially disposed within the conduit, transferring heat by passing the flue gas over the catalyst-containing tubes in the conduit in a flow direction cocurrent or countercurrent to the flow of the feed stream, reacting the feed stream within the catalyst-containing tubes associated with the conduit to form a hydrogen-containing, partially reformed hydrocarbon stream, distributing at least a portion of the partially reformed hydrocarbon stream into catalyst-containing tubes that are at least partially disposed in the chamber for reforming the partially reformed hydrocarbon stream to form a hydrogen-rich synthesis gas, and withdrawing the hydrogen-rich synthesis gas from the catalyst-containing tubes associated with the chamber. 20% to 70% or 20 to 50% of the hydrocarbon in the feed stream may be converted in the catalyst-containing tubes associated with the conduit.

The steam reforming process may also comprise mixing the hydrogen-containing, partially reformed hydrocarbon stream from one or more of the catalyst-containing tubes associated with the conduit prior to distributing to catalyst-containing associated with the chamber.

The steam reforming process may also comprise transferring heat from hydrogen-rich synthesis gas by passing the hydrogen-rich synthesis gas within an inner tube within at least one of the catalyst-containing tubes.

The current invention increases the efficiency of hydrogen and syngas production. This reduces the fuel requirement and the amount of CO2 emitted per unit of hydrogen or syngas produced. The current invention is particularly valuable when by-product steam has little value, since by implementation of the current invention, the amount of export steam is reduced to minor amounts. The current invention also allows for the reduction in the size of the fired radiant section of the reformer by 25 to 30%.

DETAILED DESCRIPTION OF THE INVENTION

Figure 1:
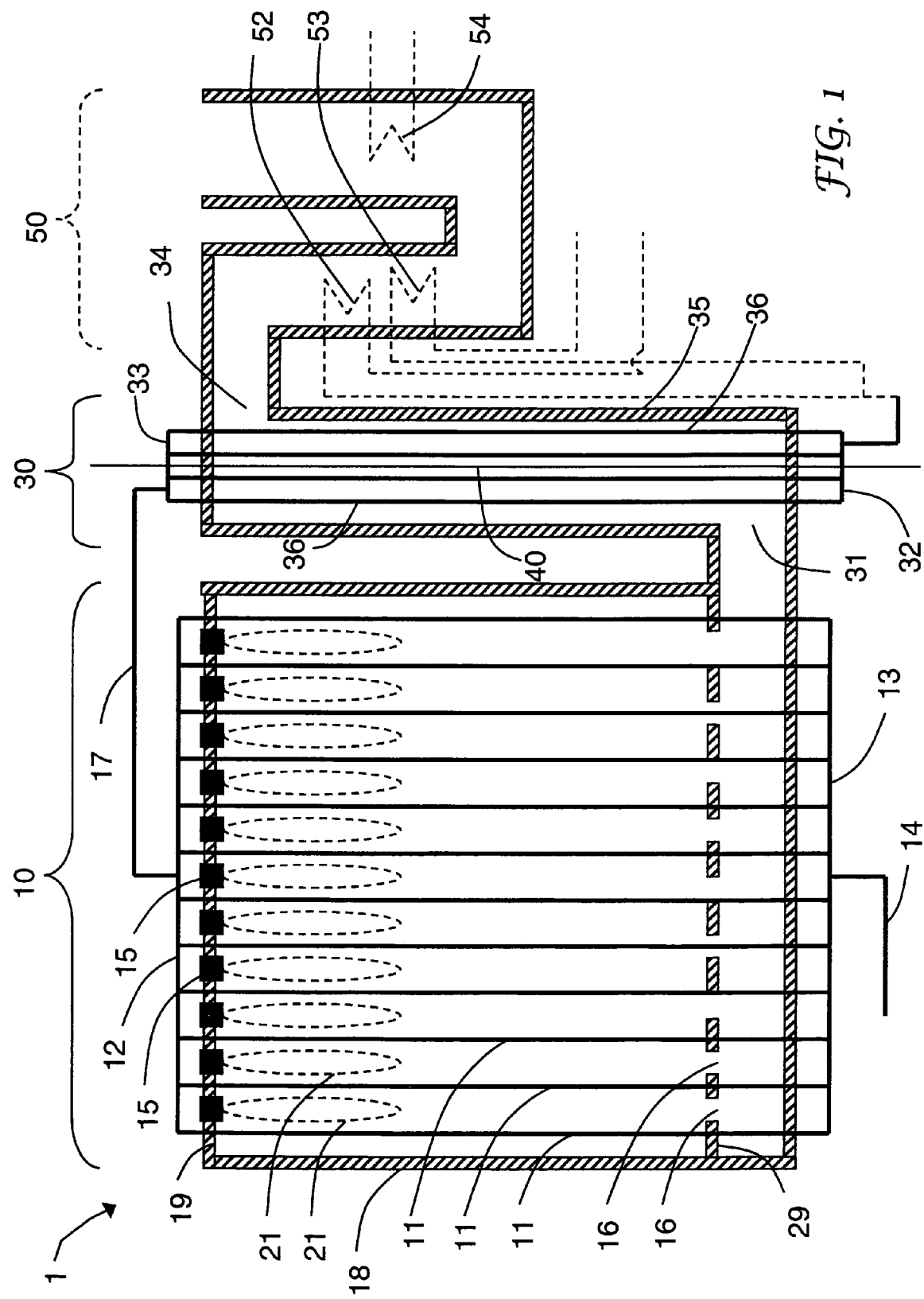
FIG. 1 is a schematic of an embodiment of the current invention illustrating a heated second reforming section where the flow of process gas in the catalyst-containing tubes is cocurrent to the flue gas.
Figure 2:
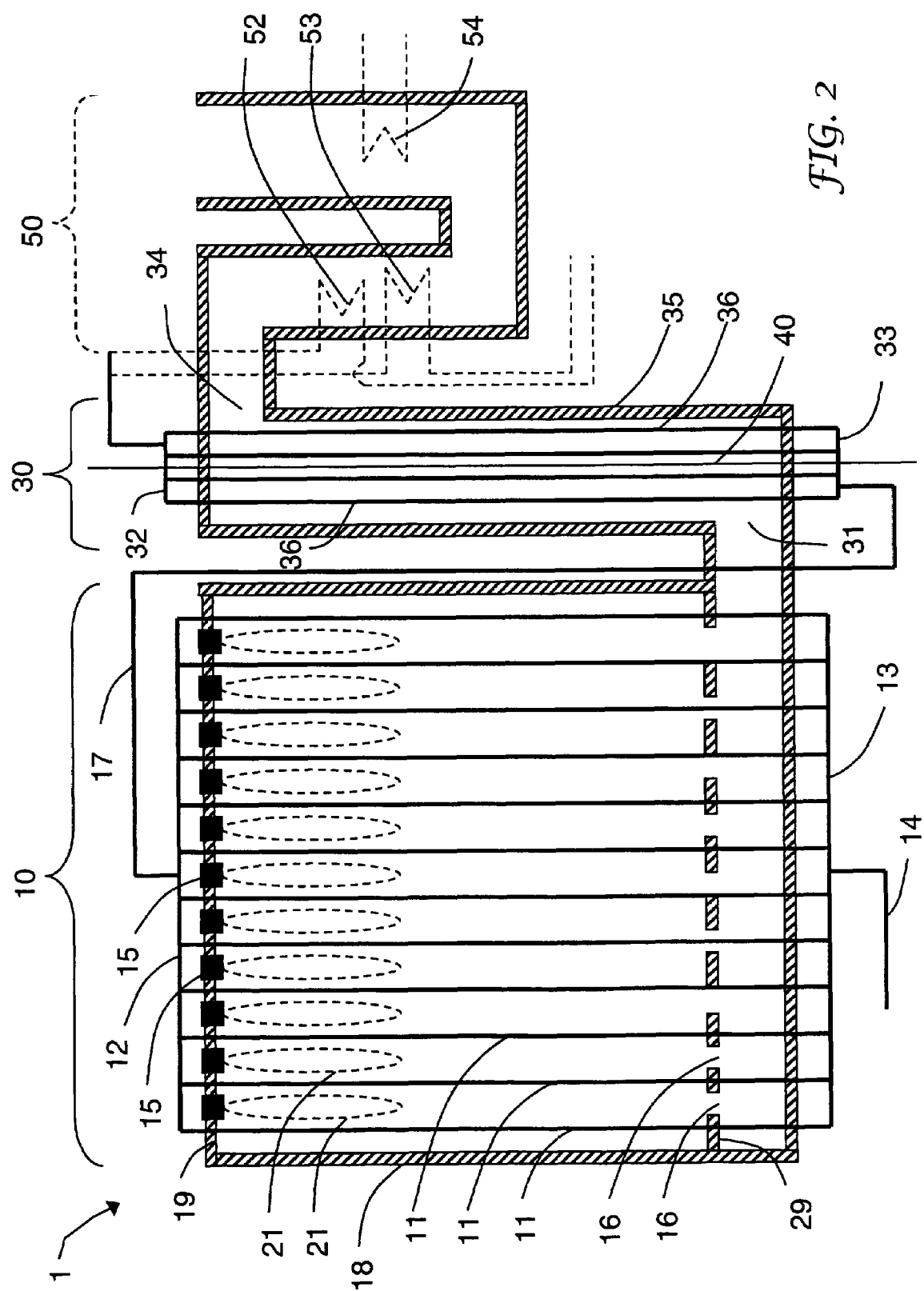
FIG. 2 is a schematic of an embodiment of the current invention illustrating a heated second reforming section where the flow of process gas in the catalyst-containing tubes is countercurrent to the flue gas.
Figure 3:
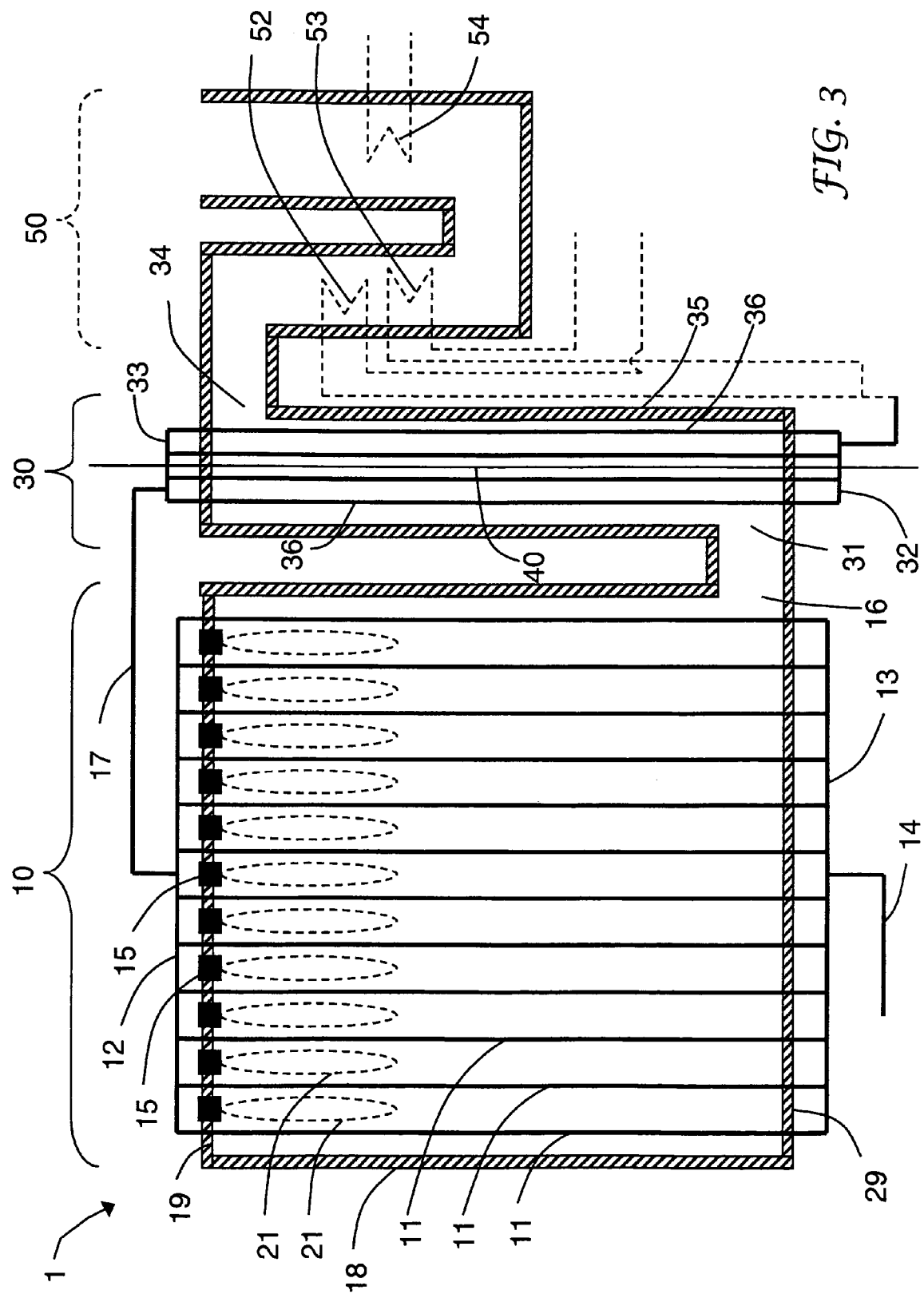
FIG. 3 is a schematic of an embodiment of the current invention illustrating an outlet of the first reforming section adjacent to the the wall opposite the wall having burners.

FIGS. 1 through 6 illustrate various embodiments of the current invention. The hydrocarbon-steam reforming apparatus 1 for producing synthesis gas comprises a first reforming section 10, and a second reforming section 30. An optional preheater section 50 is shown in FIGS. 1 through 3.

Figure 4:
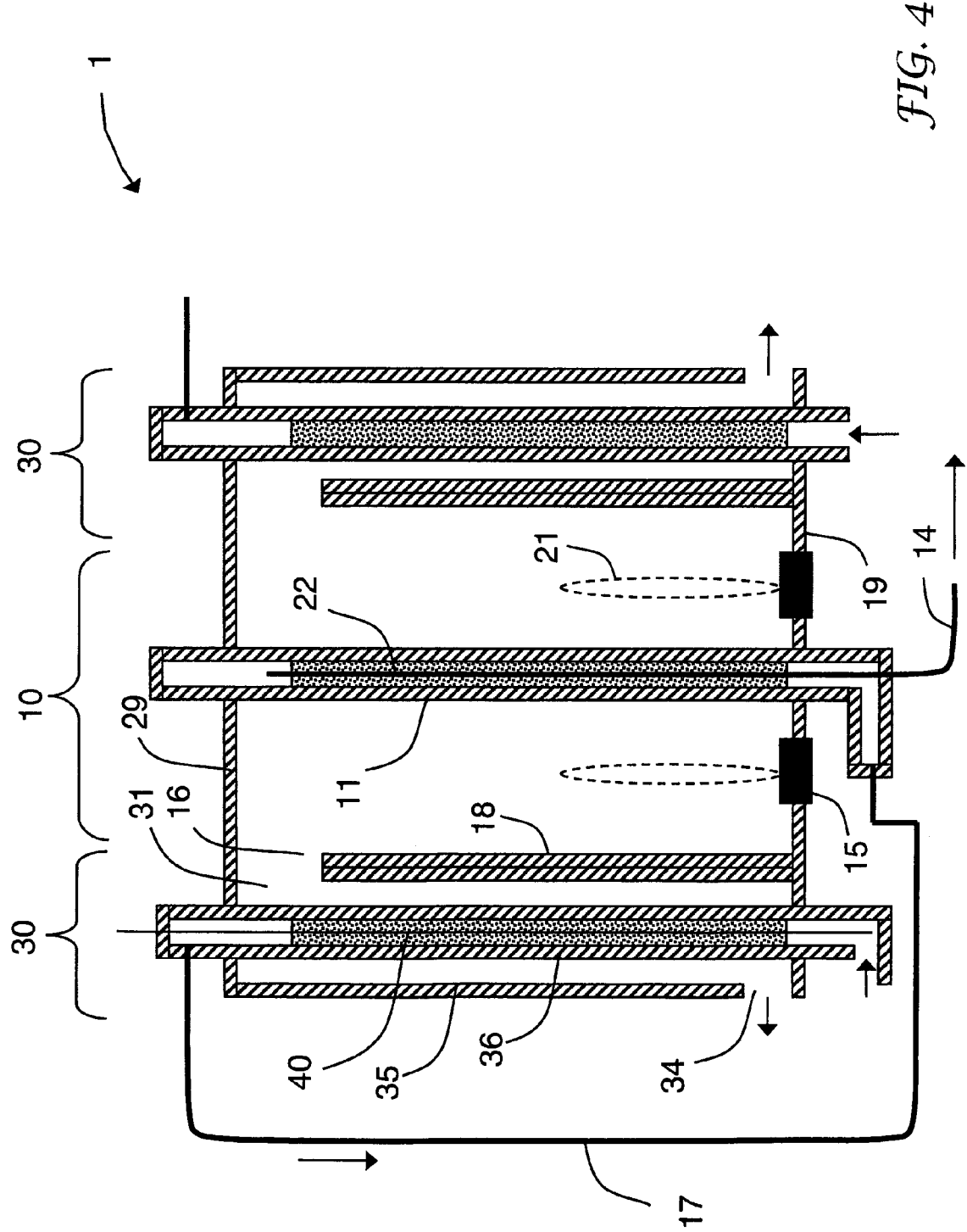
FIG. 4 is a schematic of an embodiment of the current invention illustrating an inner tube within the catalyst-containing tubes of the reforming section for transferring heat from the product gas.
Figure 5:
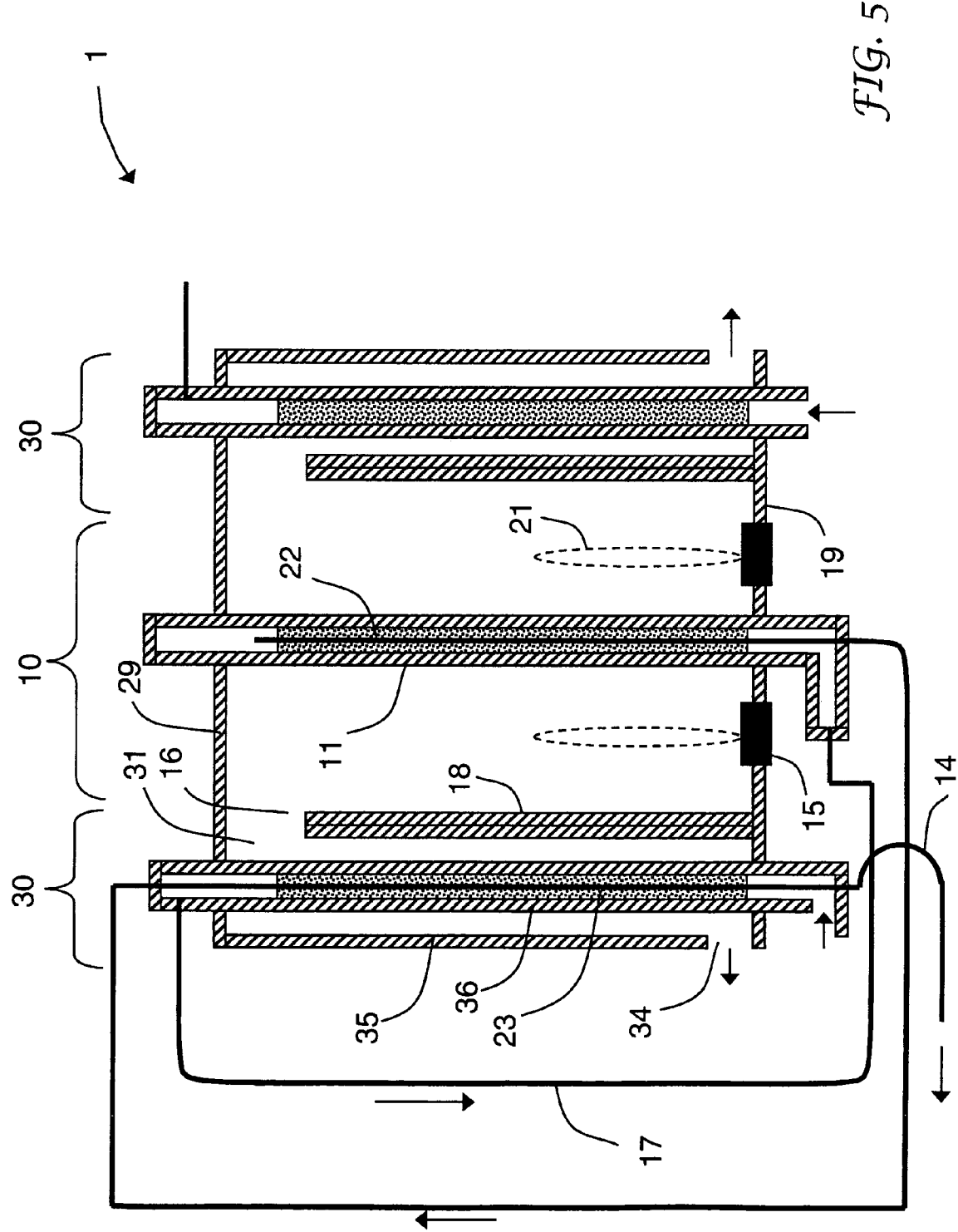
FIG. 5 is a schematic of an embodiment of the current invention illustrating an inner tube within the catalyst-containing tubes of the reforming section and the second reforming section for transferring heat from the product gas.
Figure 6:
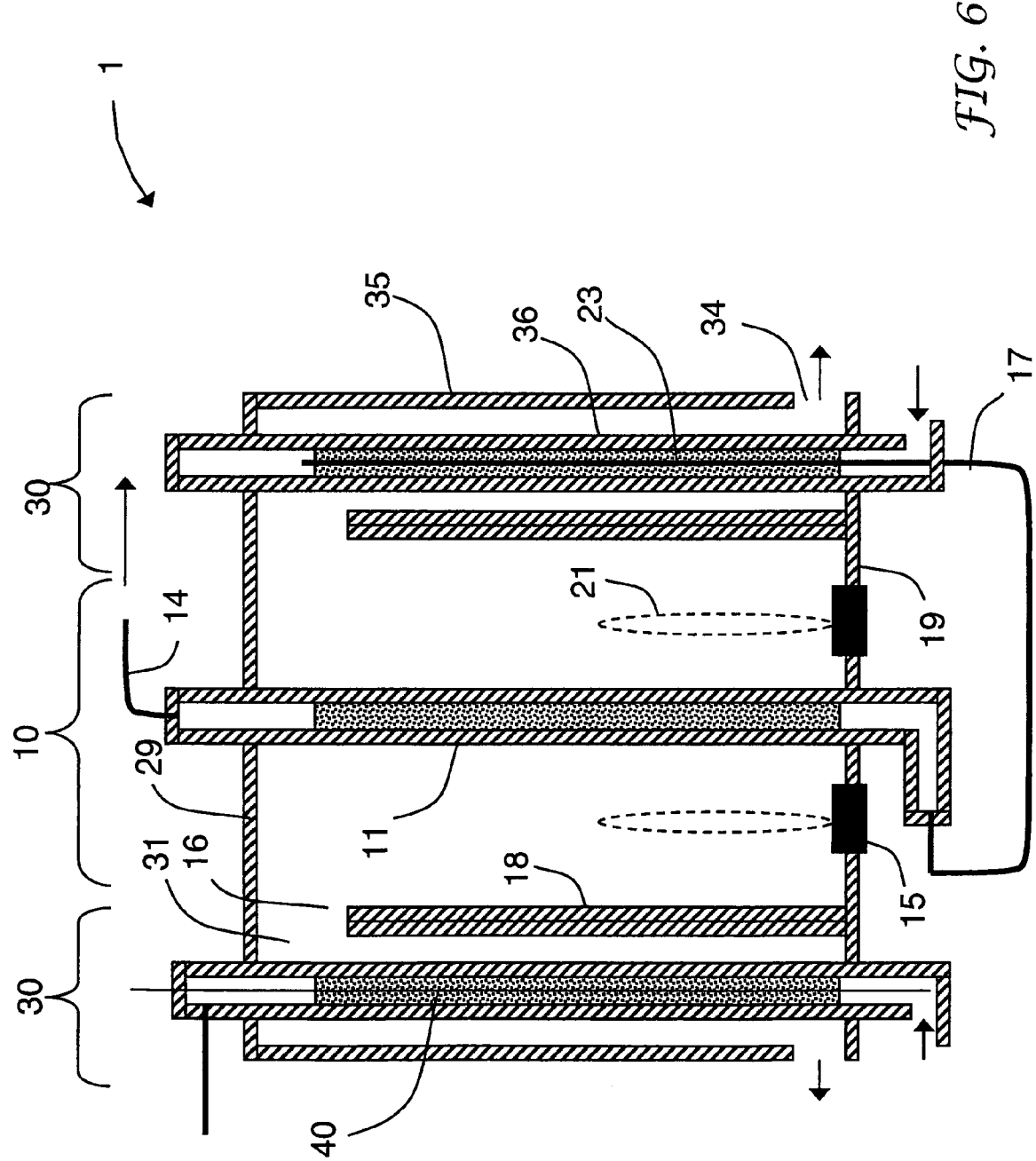
FIG. 6 is a schematic of an embodiment of the current invention illustrating an inner tube within the catalyst-containing tubes of the second reforming section for transferring heat from the process gas.

The first reforming section 10 comprises a chamber 18 having a first end wall 19 and a second end wall 29. End wall 29 is opposite end wall 19. The chamber may be a conventional refractory material or made of a composite of refractory materials. The refractory wall may be coated with a high emissivity material. The first reforming section also comprises at least one burner 15 attached or otherwise affixed to the first end wall 19 and at least one outlet 16 in the second end wall 29 as shown in FIGS. 1 and 2. The at least one outlet 16 may also be adjacent to the second end wall 29 as shown in FIGS. 3 through 6. As shown in FIGS. 1 through 3, the burners 15 may be attached to the upper wall and oriented in a down-fired orientation with the outlets 16 at the bottom of the chamber 18. The burners may also be attached to the lower wall and oriented in an up-fired orientation with an outlet at the upper wall as shown in FIGS. 4 through 6. The burners may also be attached to a side wall and oriented to fire horizontally with an outlet in the opposing side wall or adjacent the opposing side wall (not shown). The burner may be attached by any means known in the art.

The first reforming section also comprises a plurality of catalyst-containing tubes 11 for receiving a hydrogen-containing, partially reformed hydrocarbon stream. Catalyst-containing tubes may be conventional reformer tubes. A catalyst-containing tube is defined herein as any conduit holding a catalyst material therein. The plurality of catalyst-containing tubes 11 may also receive other streams in addition to the hydrogen-containing, partially reformed hydrocarbon stream, for example steam and/or another hydrocarbon feed. At least a portion of the plurality of catalyst-containing tubes 11 is disposed within the first reforming section chamber 18.

The catalyst in the catalyst-containing tubes 11 is of a conventional type known in the art for steam reforming. The catalyst may be in the form of pellets and deposited randomly within the catalyst-containing tubes. The catalyst material may be metal or ceramic monoliths or structured elements coated or impregnated with reforming catalyst, which may be useful for optimizing heat transfer and pressure drop. The plurality of catalyst-containing tubes 11 may be substantially vertical, where substantially vertical is defined herein to be within 10 degrees of vertical.

A burner is defined herein as any combination of fuel and oxidant injecting device for creating a combustion reaction. The fuel and oxidant may be introduced separately or premixed. Oxidant staging techniques may also be used. Ultra low NOx burners such as described in U.S. Pat. No. 6,773,256 and assigned to Air Products and Chemicals, Inc. may be used.

The second reforming section 30 comprises a conduit 35 having an inlet 31, an outlet 34, and a plurality of catalyst-containing tubes 36. Conduit 35 may have a circular, rectangular, square, or any other suitable cross-section and may be constructed from conventional refractory materials used in the construction of reformers. The inlet 31 is in fluid communication with outlet 16 of the first reforming section chamber 18. The tubes 36 may be constructed of conventional materials used for reformer tubes. At least a portion of the plurality of catalyst-containing tubes 36 is disposed within the conduit 35.

The plurality of catalyst-containing tubes 36 is in fluid communication with the plurality of catalyst-containing tubes 11 of the first reforming section 10. The hydrogen-containing, partially reformed hydrocarbon stream that is fed to the plurality of catalyst-containing tubes 11 is produced in the plurality of catalyst-containing tubes 36. The plurality of catalyst-containing tubes 36 may also produce other hydrogen-containing, partially reformed hydrocarbon streams that may be conveyed and processed elsewhere.

The catalyst in the catalyst-containing tubes 36 may be a conventional catalyst known in the art for steam reforming, for example a nickel catalyst or precious metal catalysts. The catalyst may be in the form of pellets and deposited randomly within the catalyst-containing tubes. The catalyst material may be metal or ceramic monoliths or structured elements coated or impregnated with reforming catalyst, which may be useful for optimizing heat transfer and pressure drop. The catalyst in the tubes 11 and tubes 36 may be the same catalyst or a different catalyst.

The length of the plurality of catalyst-containing tubes 36 may be at least 75% of the length of the plurality of catalyst-containing tubes 11. The plurality of catalyst-containing tubes 36 may be substantially vertical. The plurality of catalyst-containing tubes 36 may have enhanced heat transfer surfaces, for example fins.

The number of catalyst-containing tubes 36 in the second reforming section 30 may be less than the number of catalyst-containing tubes 11 in the first reforming section 10. Then the number of catalyst-containing tubes 36 in the second reforming section 30 may be optimized independently of the number of catalyst-containing tubes 11 in the first reforming section 10.

The conduit 35 has a longitudinal axis 40 as do each of the plurality of catalyst-containing tubes 36. The longitudinal axes of each of the plurality of catalyst-containing tubes 36 is substantially parallel with the longitudinal axis 40 of conduit 35. Substantially parallel is defined herein to be within plus or minus 10 degrees of parallel.

The longitudinal axis of the conduit relates to the lengthwise and prevailing direction between the inlet and the outlet. Ignoring the deviation due to entrance and exit effects, the prevailing flow direction of the flue gas is then in the lengthwise direction, parallel to the longitudinal axis.

The flow of the process gas in the catalyst-containing tubes may be cocurrent to the flow of flue gas, as depicted in FIG. 1 or countercurrent to the flow of flue gas as depicted in FIG. 2.

In the case of cocurrent flow of process gas and flue gas, the cold process feed gas keeps the tube walls cooler in the region where the flue gas is hottest when first entering the second reforming section 30. In the cocurrent configuration shown in FIG. 1, the process gas flows upward through the catalyst-containing tubes 36. In the case of catalyst pellets, fluidization of the pellets may be a disadvantage. However, the advantage is that the process gas exiting the catalyst-containing tubes and collected in collecting manifold 33 is in close proximity to the tube-feed end of the first reforming section 10.

In the case of countercurrent flow of process gas and flue gas depicted in FIG. 2, the tube design may be optimized freely without the constraints of fluidization. However, the disadvantage is that the catalyst-containing tubes 36 may be hotter at the end where the flue gas enters conduit 35. Another disadvantage may be that the process gas exiting the catalyst-containing tubes 36 and collected in collecting manifold 33 is not in close proximity to the tube-feed end of the first reforming section 10 and therefore may require a longer conduit 17 to connect to the distributing manifold 12.

In any embodiment, the catalyst-containing tubes 36 may be fabricated from different materials along their length. Multiple tube sections of different materials may be welded end-on-end. For example, a cast metallurgy with high nickel content may be used at the hot end and a less expensive wrought metallurgy may be used at the colder end. The catalyst-containing tubes 36 may have enhanced external heat transfer surfaces, for example fins, at the cooler end only. The catalyst-containing tubes 36 may have varying diameter along their length. A smaller tube diameter may be used at the hot end compared to the colder end. Varying heat transfer surfaces and tube diameter along the length allow for optimization of the relative rates of inside and outside heat transfer coefficients at the hot vis-à-vis the colder end. These techniques also aid flue gas distribution, and may enable insertion of one or more flue gas distribution fixtures.

The second reforming section 30 may comprise burners (not shown) or oxidant lances, however the majority of the heat duty to the catalyst-containing tubes 36 is from hot flue gases from the first reforming section 10. Oxidant lances may be used to lower NOx through oxidant staging techniques.

As shown in FIGS. 1 through 3, catalyst-containing tubes 36 may be connected by a collection manifold 33. By using collection manifold 33, the process gas from catalyst-containing tubes 36 are blended together resulting in a more uniform concentration of species distributed to catalyst-containing tubes 11. Conduit 17 connects collection manifold 33 to a distribution manifold 12, which is in fluid communication with catalyst-containing tubes 11. Catalyst-containing tubes 11 may be connected by a collection manifold 13, which feeds product stream conduit 14. The product stream from conduit 14 may be further processed similar to the product from any fired, tubular reformer. In particular, the stream may be processed in a shift reactor and the various components separated and recycled.

The optional preheat section 50, shown in FIGS. 1 through 3 comprises a heat exchanger 52 for preheating a hydrocarbon feed stream, a heat exchanger 53 for superheating steam, and heat exchanger 54 for heating air that may be subsequently introduced through burners 15. The hydrocarbon feed gas stream may be indirectly heated in a heat exchanger by the hydrogen-rich product stream. Steam may be generated by indirect heat exchange with the hydrogen-rich product stream. Heated or unheated hydrocarbon feed gas may be mixed with steam and then indirectly heated in a heat exchanger by the flue gas. Heat exchangers 52, 53, and 54 are of a conventional type known in the art and may be in any order or sequence at the preference of the designer.

The steam reforming apparatus may also optionally comprise a conventional adiabatic prereformer before and/or after the second reforming section with or without additional heat exchangers.

FIG. 4 shows an embodiment comprising an inner tube disposed within the catalyst-containing tube in the reforming section. The inner tube contains no catalyst. The tube-in-tube arrangement permits the process gas in catalyst-containing tube 11 to recover heat from the hot product gas in inner tube 22. An inner tube 23 containing no catalyst for recovering heat may also be employed in the catalyst-containing tube 36 as shown in FIGS. 5 and 6. Various details of tube-in-tube arrangements are discussed in Pham et al., U.S. application Ser. No. 10/746,577.

Burners 15 produce flames 21 thereby generating a hot flue gas. Fuel for combustion may be of any conventional type used in reformers. Oxidant for combustion may be air or oxygen-enriched air and may be preheated in the optional preheater section 50 in heat exchanger 54. Oxygen-enriched air is defined herein as any oxidant having an oxygen concentration between 21% and 100%. Radiant energy from the flame is transferred to catalyst-containing tubes 11 for reforming a hydrocarbon steam mixture, hence the common term radiant section of the reformer. In FIGS. 1 through 3, the burners are shown attached to the upper wall of the chamber 18, and produce downward flames, hence the common term down-fired reformer. In FIGS. 4 through 6, the burners are shown attached to the lower wall of the chamber 18 and produce upwardly directed flames.

The flue gas exits chamber 18 through outlets 16 at the opposite end of the chamber from the burners 15 and is passed to the inlet 31 of the second reforming section 30. The flue gas moves through conduit 35 in the lengthwise direction to the outlet 34. The flue gas may pass over the catalyst-containing tubes 36 cocurrently as shown in FIG. 1 or countercurrently as shown in FIG. 2. After leaving the second reforming section 30, the flue gas is passed to the optional preheater section 50 and exhausted or vented.

Process or feed gas comprising a hydrocarbon and steam is introduced to the second reforming section 30. In FIGS. 1 through 3, the feed gas is introduced via distribution manifold 32. The feed to the second reforming section 30 may have a steam-to-carbon ratio on a molar basis between 2 and 5, or between 2.5 and 3.5. The pressure may be between 100 and 800 psia or between 300 and 500 psia. The hydrocarbon stream may first be preheated in the optional preheater section 50 in heat exchanger 52. The steam stream may be created or superheated in the optional preheater section 50 in heat exchanger 53. The hydrocarbon stream and the steam stream may be premixed and preheated before being introduced to manifold 32. The temperature may be between 700° F. (371° C.) and 1200° F. (649° C.) or between 950° F. (510° C.) and 1100° F. (593° C.).

The hydrocarbon-steam mixture is partially reformed in catalyst-containing tubes 36 thereby producing a hydrogen-containing, partially reformed hydrocarbon stream. The hydrogen-containing, partially reformed hydrocarbon stream from the second reforming section will have been brought closer to equilibrium by the reaction affected by the catalyst and will have absorbed heat via heat transfer with the flue gas flowing cocurrently or countercurrently over the outside of the catalyst-containing tubes 36. The temperature of the process gas may be higher, lower, or unchanged as a result of the competition between the endothermic reaction, which tends to lower the temperature, and the absorbed heat, which raises the temperature. The hydrogen-containing, partially reformed stream may exit the catalyst-containing tubes 36 at temperature between 1000° F. (538° C.) and 1400° F. (760° C.).

20% to 70% or 20% to 50% of the hydrocarbon in the feed stream may be converted in the catalyst-containing tubes 36. Converted means conversion to a different species. For example, if methane is the hydrocarbon of interest, then $CH_4 + H_2O \rightarrow CO + 3\,H_2$. If the feed contains 100 mols/hr of $CH_4$, 20% conversion means that the partially reformed stream contains 80 mols/hr of $CH_4$, and 95% conversion means that the partially reformed stream contains 5 mols/hr of $CH_4$.

In FIGS. 1 through 3, the hydrogen-containing, partially reformed stream is collected in collection manifold 33 and passed through conduit 17 to distribution manifold 12 in the first reforming section 10. From distribution manifold 12, the hydrogen-containing, partially reformed stream moves through catalyst-containing tubes 11 and is reformed thereby producing a hydrogen-rich synthesis gas. The hydrogen-rich synthesis gas is collected in collection manifold 13 and transferred to product stream conduit 14. The hydrogen-rich synthesis gas may be further processed, for example, in a shift reactor.

In FIGS. 4 and 5, the hydrogen-rich synthesis gas is passed through an inner tube 22 within catalyst-containing tube 11 to recover heat from the hydrogen-rich synthesis gas before exiting through product stream conduit 14. FIG. 5 shows the hydrogen-rich synthesis gas passing through inner tube 23 within catalyst-containing tube 36 to recover even more heat from the hydrogen-rich synthesis gas. FIG. 6 shows a hydrogen-containing, partially reformed stream from catalyst-containing tube 36 passing through inner tube 23 within catalyst-containing tube 36 to provide more heat for the feed gas and is then fed to catalyst containing tube 11.

The invention has been described above with reference to preferred embodiments and specific examples for the purpose of illustration, and not by way of limitation. Many variations will become apparent to the skilled artisan in view of the above disclosure. It is intended that all such variations within the scope or spirit of the appended claims shall be embraced thereby.

The invention claimed is:

1. A steam reforming process for producing synthesis gas comprising:

introducing a fuel and an oxidant from a first end of a chamber and reacting therein, thereby generating a flue gas;

withdrawing the flue gas from an outlet at the end opposite the first end of the chamber;

introducing the flue gas from the chamber to a first end of a conduit;
withdrawing the flue gas from a second end of the conduit;
introducing a feed stream comprising a hydrocarbon and steam into a first plurality of catalyst-containing tubes at least partially disposed in the conduit;
transferring heat by passing the flue gas over the first plurality of catalyst-containing tubes in a flow direction cocurrent to the flow of the feed stream;
reacting the feed stream within the first plurality of catalyst-containing tubes to form a hydrogen-containing, partially reformed hydrocarbon stream;
distributing at least a portion of the partially reformed hydrocarbon stream into a second plurality of catalyst-containing tubes at least partially disposed in the chamber for reforming the partially reformed hydrocarbon stream to form a hydrogen-rich synthesis gas; and
withdrawing the hydrogen-rich synthesis gas from the second plurality of catalyst-containing tubes.

2. The process of claim 1 further comprising:
mixing the hydrogen-containing, partially reformed hydrocarbon stream from at least one of said first plurality of catalyst-containing tubes with the hydrogen-containing, partially reformed hydrocarbon stream of another of said first plurality of catalyst-containing tubes prior to the step of distributing.

3. The process of claim 1 further comprising:
transferring heat from the hydrogen-rich synthesis gas by passing the hydrogen-rich synthesis gas within an inner tube within at least one of said first plurality of catalyst-containing tubes.

4. The process of claim 1 further comprising:
transferring heat from the hydrogen-rich synthesis gas by passing the hydrogen-rich synthesis gas within an inner tube within at least one of said second plurality of catalyst-containing tubes.

5. The process of claim 1 wherein 20% to 70% of the hydrocarbon in the feed stream is converted in the first plurality of catalyst-containing tubes.

6. The process of claim 1 wherein 20% to 50% of the hydrocarbon in the feed stream is converted in the first plurality of catalyst-containing tubes.

* * * * *